(12) United States Patent
Lu

(10) Patent No.: US 7,649,447 B2
(45) Date of Patent: Jan. 19, 2010

(54) WIRELESS BIKE BRAKE LIGHT

(75) Inventor: Yen-Ho Lu, No. 66, Tai-Ho Central Street, 13F, ChangHua City (TW) 500

(73) Assignee: Yen-Ho Lu, Taichung (TW)

( * ) Notice: Subject to any disclaimer, the term of this patent is extended or adjusted under 35 U.S.C. 154(b) by 366 days.

(21) Appl. No.: 11/653,537

(22) Filed: Jan. 17, 2007

(65) Prior Publication Data

US 2007/0205885 A1    Sep. 6, 2007

(30) Foreign Application Priority Data

Mar. 2, 2006    (TW) .............................. 95203457 U

(51) Int. Cl.
*B60Q 1/50*    (2006.01)
(52) U.S. Cl. ........................ 340/467; 340/432; 340/427; 340/479; 362/473
(58) Field of Classification Search ................. 340/467, 340/432, 438, 427, 479; 362/473, 802
See application file for complete search history.

(56) References Cited

U.S. PATENT DOCUMENTS

| 4,723,078 | A  | * | 2/1988  | Neuffer et al. | ............... | 340/436  |
| 6,009,150 | A  | * | 12/1999 | Kamel          | ..................... | 379/88.22 |
| 6,204,752 | B1 | * | 3/2001  | Kishimoto      | .................. | 340/432  |
| 7,005,901 | B1 | * | 2/2006  | Jiang et al.   | .................. | 327/130  |
| 7,221,263 | B2 | * | 5/2007  | Moore et al.   | ................. | 340/427  |

* cited by examiner

*Primary Examiner*—Anh V La

(57) ABSTRACT

This invention proposes a wireless bike brake light that can respond to braking when bikes are in motion. The invention employs a MEMS (micro electro mechanical system)-structured accelerometer chip as sensor to detect related signals. A control circuits unit processes the signals, and then sends appropriate brake light to following vehicles based. The features of the invention are that (1) It can provide extra security when serving as a brake light with independence of braking system, (2) It is easily to install and durable, (3) It can be also applied to such sports as skiing, skateboarding, etc. that are not equipped with apparent brake devices, and thus hard to incorporate brake lights.

1 Claim, 3 Drawing Sheets

WIRELESS BIKE BRAKE LIGHT

FIELD OF THE INVENTION

This invention mainly employs a MEMS-structured accelerometer and controlling techniques to make possible a wireless bike brake light that can respond to not only "severe" braking, but also "light" braking.

BACKGROUND OF THE INVENTION

Prior Art 1: An old-fashioned wireless bike brake light, which emits radio to trigger brake light when a bike rider depresses the brake levels. The drawbacks include (1) a rider needs to install sensors on both brake levels of a bike, which actually causes a practical problem in installation because a different kind or brand of bike has the brake level of different shape or design. (2) For sports like skiing or snowboarding, such a product would not work because it does not have the apparent brake mechanisms that can serve as triggering devices.

Prior Art 2: There were several severe brake light inventions that employ accelerometers, such as U.S. Pat. No. 6,249,219, a severe braking light system. It may work for responding to "severe" braking, but may not work for "light" braking function. It is because the gravitational effect may cause significant errors on deceleration detecting. Given detecting "light" deceleration of 0.1 G for example, if a bike is just stopped on a downhill slope of 10 degrees, the brake light will mistakenly light up because the G-force of 0.17 G will exceed deceleration threshold of 0.1 G although the bike is actually still, not decelerating. If detecting "severe" brake, then it would be a forgiven error. Given detecting "severe" deceleration of 2.0 G for example, if a bike is just stopped on a downhill slope of 10 degrees, the brake light will not mistakenly light up because G-force of 0.17 G is still very far from the deceleration threshold of 2.0 G.

BRIEF SUMMARY OF THE INVENTION

The main features of this invention are the employment of a MEMS-structured accelerometer chip, and controlling techniques, which enable the invention to give off brake light when encountering mechanical frictions—mainly by braking, even if the braking is light. It is so because (1) the applied vehicle is a bike, which has special character, and (2) the control circuits unit of this invention also detects stop/moving status of the bike besides deceleration. A bike has different characters (very low natural mechanical frictions) from cars or motorcycles. When a bike accelerates on downhill road naturally without pedaling, theoretically the accelerometer will output the same signal magnitude as that when a bike is slowing down gradually naturally without pedaling on the plain road, or when a bike is slowing down rapidly naturally without pedaling on uphill road. This is so because when a bike accelerates on downhill road naturally without pedaling, the acceleration effect will be mostly offset by gravity due to its "low friction" character. On the contrary, when a bike decelerates on uphill road naturally without pedaling, the deceleration effect will also be offset by gravity.

Aforementioned situation makes the signal triggered by braking can always be detected by the accelerometer regardless of actual acceleration/deceleration condition of the bike and the disturbance of G-force, and the deceleration signal detected by accelerometer can be mostly attributable to the activation of brakes. The only problem happens when a bike stops on a steep downhill road because the accelerometer will sense G-force only, which makes the brake light mistakenly light up given that the bike is NOT actually in motion, and also NOT in deceleration condition. The control circuits unit of this invention solves the problem by detecting stop/moving status of the bikes. So, when the control circuits unit detects that the bike is not moving, it will NOT command the lighting device to give off brake light even if a deceleration signal is also detected by the accelerometer (because it could be caused by G-force, not really by deceleration force), making brake light only responsive when bikes in motion encounter noticeable mechanical frictions mainly by braking.

To further clarify, when a bike is accelerating on a steep downhill road with brakes activated to mitigate the acceleration, the brake light of this invention will light up despite of the fact of accelerating, because what the accelerometer actually captures represents the deceleration signal caused by the brakes. That is why this invention is called "wireless brake light" instead of "wireless deceleration light".

BRIEF DESCRIPTION OF THE DRAWINGS

FIG. 2 shows an overview of this invention.

DETAILED DESCRIPTION OF THE INVENTION

Figure 1:
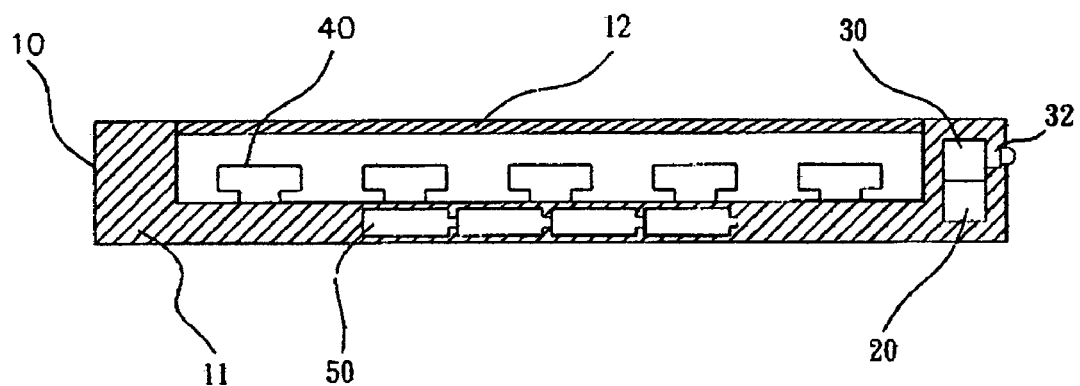
FIG. 1 and FIG. 2 show an overview of this invention.
Unit 10 is an exemplary main body.
Unit 11 is an exemplary Body base.
Unit 12 is an exemplary transparent cover.
Unit 20 is an exemplary accelerometer.
Unit 30 is an exemplary control circuits.
Unit 31 is an exemplary micro-controller.
Unit 32 is an exemplary switch.
Unit 40 is an exemplary lighting device.
Unit 50 is an exemplary power.
Unit 60 is an exemplary fixing device.
Figure 2:
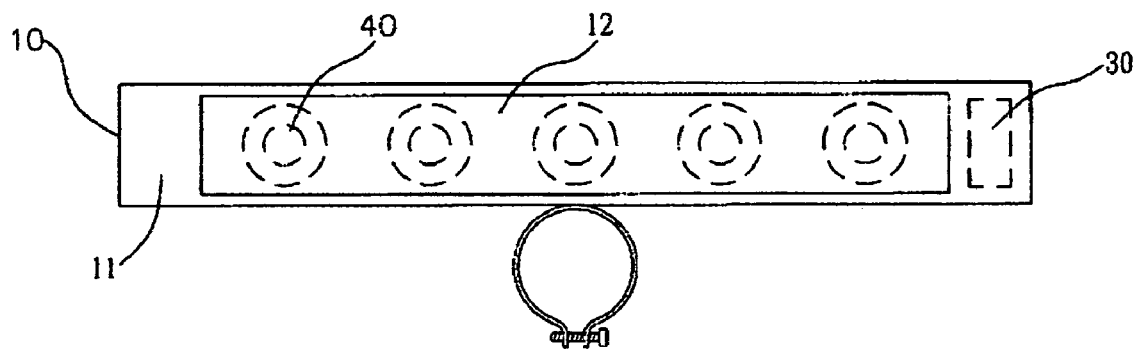
Figure 3:
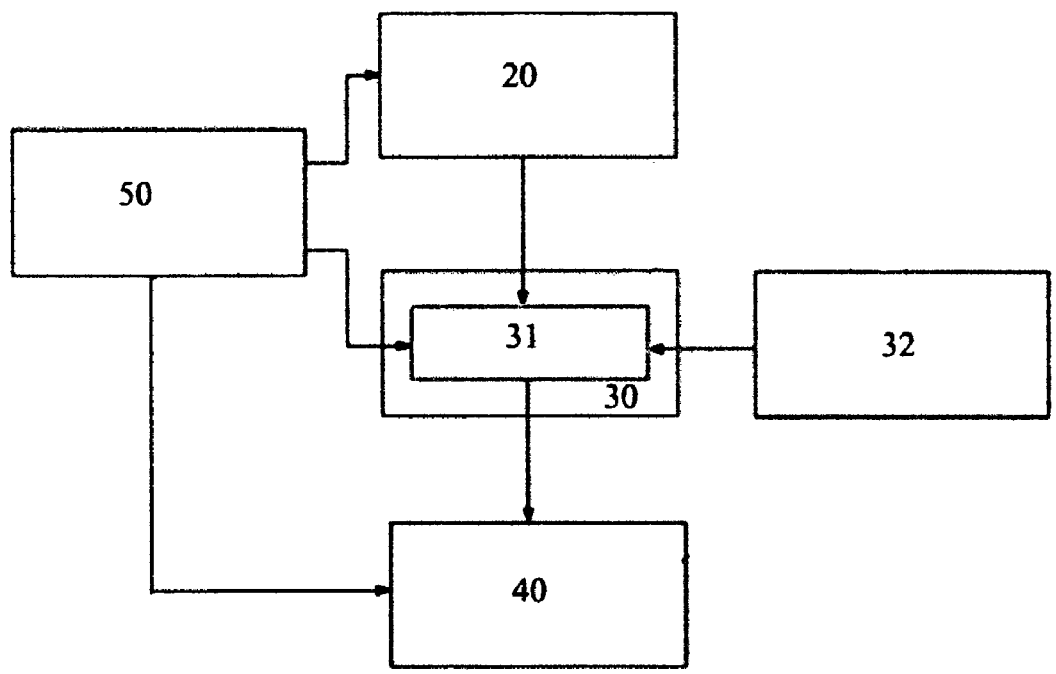
FIG. 3 shows an overview of control of the preferred embodiment.

In the following descriptions and explanations, reference is made to the In order to understand better, please see following descriptions and explanations for a preferred embodiment with reference to FIGS. 1, 2, and 3. The invention of a wireless bike brake light comprises: a main body 10, an accelerometer 20, a control circuit 30, a lighting device 40, a power 50 and a fixing device 60; The main body 10, comprising a hollowed body base 11 and a transparent cover 12, is used to contain and protect the accelerometer 20, the control circuits unit 30, and the lighting device 40.

The accelerometer 20 is MEMS-structured and chip-shaped, which actually outputs a mixed signal of G-force and acceleration/deceleration conditions of bikes (Ex. if G-force exerted is −0.3 G and the bike accelerates at +0.5 G, then the accelerometer would output a signal magnitude equaling to +0.2 G) to the control circuits unit 30 for further analysis.

The control circuits unit 30 comprises a switch 32 and a micro-controller 31, which can store software to control the system. The micro-controller 31 is electrically connected with the accelerometer 20, the lighting device 40 and the power 50. Settings preprogrammed inside the software of the micro-controller 31 comprises: several regular lighting modes that work during non-braking condition (for example, flashing light, regular steady light), at least one brake light mode (for example, strongly bright steady light) that works when micro-controller 31 judges that brakes are activated, a vibration threshold used to determine if the applied vehicle is in motion, and at least one deceleration threshold used for comparison to determine if brakes are activated. The switch's 32 functions comprise: setting the deceleration threshold of users' preferences, and turn on the power to select one of the regular lighting modes. By the receipt of accelerometer signal and signal processing, the control circuits unit 31 commands the lighting device 40 to give off lights between regular lighting mode and brake light mode based on if the activation of brakes is recognized.

For better functionality, the invention further suggests multiple deceleration thresholds for riders to choose based on their preferences because different riders may have different preferences on brake light-triggering sensitivity. The higher the deceleration threshold, the harder the brakes need to be depressed to trigger the brake light. (Ex. a deceleration of 0.1 G caused by brakes will not trigger the brake light on a deceleration threshold of 0.2 G because it is not severe enough to be viewed as deceleration.)

Regarding to detecting stop/moving status, the vibration threshold is set to compare with the changing rate of the signal. If the changing rate is lower than the vibration threshold, then it can be judged that the bike is not moving. Another benefit of detecting stop/moving status is to make auto power-off function possible.

The lighting device 40 could be LED or regular lamps. The power 50 could be batteries, dynamo, solar power, or other possible power source, and is supplying electricity to the accelerometer 20, the control circuits unit 30 and the lighting device 40. The fixing device 60 could be a bracket, a band, or screws to fix the light on the applied bike.

Figure 4:
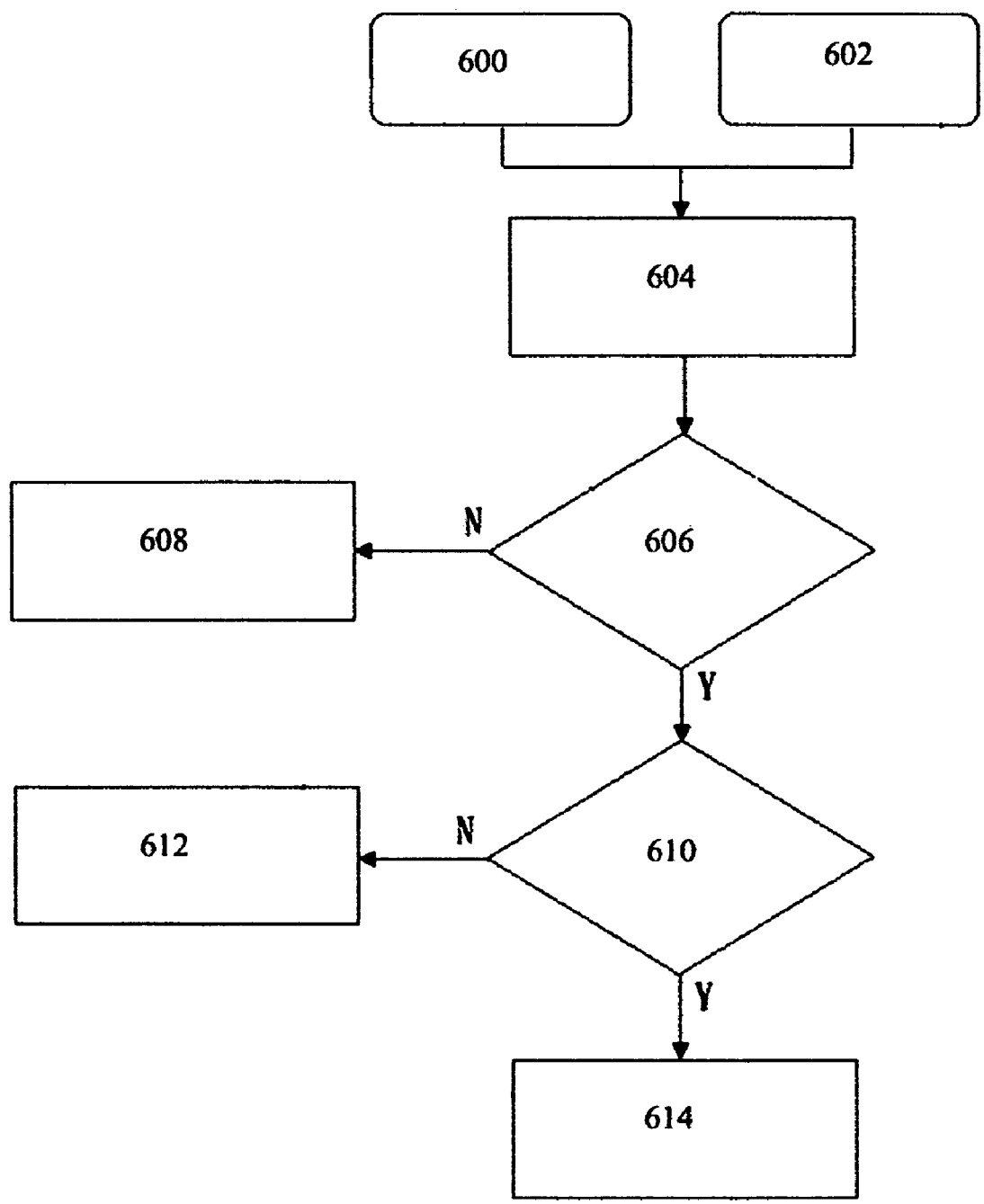
FIG. 4 shows the control flow of the preferred embodiment
600—threshold setup
602—turn on the power and select one among all regular lighting modes
604—obtain after-low-pass-function signal from accelerometer
606—first-level signal judgment (still/motion judgment)
608—the bike is still, and control circuits unit outputs command signals as appropriate to the lighting device.
610—second-level signal judgment (regular motion/deceleration judgment)
612—the bike is in regular motion (acceleration or stable speed), and control circuits unit sends command signals as appropriate to the lighting device.
614—the bike is in deceleration, and control circuits unit commands the lighting device to activate brake light

Further can be apparent by reference to the control flow of the control circuits unit of this invention as FIG. 4. An exemplary embodiment is explained as follows. First, the proposed light is fixed on the seat post of a bike on the plain place with the transparent cover 12 and the lighting device 40 facing following vehicles. As Flow 600, the rider sets, with interacting with the software inside the micro-controller 31 the deceleration threshold of his preference by manipulating the switch 32 to determine deceleration threshold. (Take a software design preprogrammed inside the micro-controller 31 for example: pressing down the switch for 5 sec to enter deceleration threshold setting mode that stays for 10 sec, and a corresponding threshold can be set by the number of pressing on the switch during the setting mode period.) Of course, this deceleration threshold setting can be also accomplished by factory beforehand.

Then, before riding as shown in Flow 602, the rider turns on the power and select one of the regular lighting modes preprogrammed inside the micro-controller 31 by pressing the switch 32. After the power is turned on, then as shown in Flow 604, the accelerometer 20 will keep outputting voltage signals to the control circuits unit 30 for analysis. Then as shown in Flow 606, the control circuits unit 30 first tries to filter high frequency signal (because high-frequency noise may incur significant errors when detecting "light" braking, thus causing malfunctions) of the accelerometer 20 through its low-pass filtering function (Ex. this can be done either by hardware combination of resistors and capacitors or software inside micro-controller 31, such as moving-average effect), and undergoes first-level signal judgment by checking voltage magnitude changing rate to see if the bike is in motion or stays still. If the changing rate of the voltage of the received signal is lower than the preset vibration threshold, then the bike shall be viewed as staying still, otherwise viewed as in motion. As shown in Flow 608, if the bike is still, the micro-controller 31 commands the lighting device 40 to still give off the original regular lighting mode as set when turning on the power, and starts to count time. And if the bike is staying still for a certain time, then the micro-controller 31 shuts down the system automatically. As shown in Flow 610, if the bike is viewed as in motion, then micro-controller 31 will undergo the second-level signal judgment to determine if the brakes are activated. As shown in Flow 612, if the bike is judged in non-braking condition, then the lighting device 40 is commanded to still give off the original regular lighting mode as set when turning on the power (such as flashing light). As shown in Flow 614, if the bike is judged as in braking condition, then the lighting device 40 is commanded to give off brake light mode (such as strongly bright steady light).

Such an invention provides users with extra security that prior arts do not have. With all aforementioned, the invention deserves grant of a patent based on its capability of industrial application and absolute novelty. The example illustrated above is just an exemplary embodiment for the invention, and shall not be utilized to confine the scope of the patent. Any equivalent modifications within the scope of claims of the patent shall be covered in the protection for this patent.

While certain preferred embodiments have been described and shown in the accompanying drawings, it is to be understood that such embodiments are merely illustrative of, and not restrictive on, the broad invention. Other embodiments that are apparent to those of ordinary skill in the art, including embodiments that do not provide all of the features and advantages set forth herein, are also within the scope of this invention.

Further, it is to be understood that this invention is not limited to the specific construction and arrangements shown and described since various modifications or changes may occur to those of ordinary skill in the art without departing from the spirit and scope of the invention. Accordingly, the scope of the invention is defined by the claims that follow. In the claims, a portion shall include greater than none and up to the whole of a thing.

What is claimed is:

1. A wireless bike brake light comprising: a power; a lighting device that receives commands to give off lights at a mode as appropriate; an accelerometer that is MEMS-structured, chip-shaped and employed to detect linear deceleration conditions of the bike; a control circuits unit that is electrically connected to the said accelerometer, power and lighting device, and employed to process signals sent from the said accelerometer and then gives appropriate commands to the said lighting device; its features mainly comprises: the said control circuits unit has a low-pass signal filtering function that filters high-frequency voltage signals coming from the said accelerometer, and can judge if the bike is still or in motion; and based on detection of vibration from the said accelerometer, moreover the said control circuits unit has an auto power-off function that activates when the applied bike stays still for a preset period of time.

* * * * *